United States Patent
Zhang et al.

(10) Patent No.: US 11,475,588 B2
(45) Date of Patent: Oct. 18, 2022

(54) IMAGE PROCESSING METHOD AND DEVICE FOR PROCESSING IMAGE, SERVER AND STORAGE MEDIUM

(71) Applicant: BEIJING BAIDU NETCOM SCIENCE AND TECHNOLOGY CO., LTD., Beijing (CN)

(72) Inventors: Xiaohan Zhang, Beijing (CN); Ye Xu, Beijing (CN); Kexin Ren, Beijing (CN); Zhifan Feng, Beijing (CN); Yang Zhang, Beijing (CN); Yong Zhu, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 64 days.

(21) Appl. No.: 16/751,011

(22) Filed: Jan. 23, 2020

(65) Prior Publication Data
US 2020/0294267 A1  Sep. 17, 2020

(30) Foreign Application Priority Data
Mar. 12, 2019  (CN) .......................... 201910184113.4

(51) Int. Cl.
*G06T 7/73* (2017.01)

(52) U.S. Cl.
CPC ...... *G06T 7/74* (2017.01); *G06T 2207/30201* (2013.01)

(58) Field of Classification Search
CPC ................. G06K 9/00664; G06T 7/74; G06T 2207/30201; G06V 20/10; G06V 20/70
See application file for complete search history.

(56) References Cited

U.S. PATENT DOCUMENTS 10,157,226 B1* 12/2018 Costabello ............ G06F 16/313
2020/0356829 A1* 11/2020 Costabello ............ G06F 40/284

FOREIGN PATENT DOCUMENTS

| CN | 107833082 A | 3/2018 |
| CN | 108171213 A | 6/2018 |
| CN | 109271542 A | 1/2019 |

OTHER PUBLICATIONS

Aditya, Somak, et al. "Image understanding using vision and reasoning through scene description graph." Computer Vision and Image Understanding 173 (2018): 33-45. (Year: 2018).*

Ma, Lin, et al. "Multimodal Convolutional Neural Networks for Matching Image and Sentence." 2015 IEEE International Conference on Computer Vision (ICCV). IEEE, 2015. (Year: 2015).*

(Continued)

*Primary Examiner* — Vu Le
*Assistant Examiner* — Tracy Mangialaschi
(74) *Attorney, Agent, or Firm* — Lathrop GPM LLP

(57) ABSTRACT

Embodiments of the present provide a method and a device for processing an image, server and storage medium. The method includes: determining, based on an object type of an object in an image to be processed, a feature expression of the object in the image to be processed; and determining an entity associated with the object in the image to be processed based on the feature expression of the object in the image to be processed and a feature expression of an entity in a knowledge graph.

14 Claims, 3 Drawing Sheets

(56) References Cited

OTHER PUBLICATIONS

Deng, Li-Qiong, Gui-Xin Zhang, and Yuan Ren. "Image Semantic Analysis and Application Based on Knowledge Graph." 2018 11th International Congress on Image and Signal Processing, BioMedical Engineering and Informatics (CISP-BMEI). IEEE, 2018. (Year: 2018).*

Baier, Stephan, Yunpu Ma, and Volker Tresp. "Improving visual relationship detection using semantic modeling of scene descriptions." International Semantic Web Conference. Springer, Cham, 2017. (Year: 2017).*

Chinese Patent Application No. 201910184113.4 First Office Action dated Sep. 2, 2020, 7 pages.

Chinese Patent Application No. 201910184113.4 English translation of First Office Action dated Sep. 2, 2020, 7 pages.

European Patent Application No. 20150891.8 extended Search and Opinion dated Jul. 20, 2020, 10 pages.

Aditya, S. et al. "Image understanding using vision and reasoning through scene description graph" Computer Vision and Image Understanding, vol. 173, Aug. 2018, pp. 33-45.

Orlandi. F. et al. "Leveraging knowledge graphs of movies and their content for web-scale analysis" 14th International Conference on Signal-Image Technology & Internet-Based Systems (SITIS) Nov. 26, 2018, pp. 609-616.

Fang, Y et al. "Object detection meets knowledge graphs" IJCAI'17: Proceedings of the 26th International Joint Conference on Artificial Intelligence, Aug. 2017 pp. 1661-1667.

Baier, S. et al. "Improving visual relationship detection using semantic modeling of scene descriptions" arXiv.org, Cornell University Library, Sep. 1, 2018, 15 pages.

Li, G. et al. "Incorporating external knowledge to answer open-domain visual questions with dynamic memory networks" arXiv.org, Cornell University Library, Dec. 3, 2017, 11 pages.

Japanese Patent Application No. 2020-042089 Office Action dated Dec. 28, 2021, 3 pages.

Japanese Patent Application No. 2020-042089 English translation of Office Action dated Dec. 28, 2021, 2 pages.

Yuan, F. et al. "End-to-End Video Classification with Knowledge Graphs" arXiv:1711.01714; Nov. 6, 2017; 10 pages.

* cited by examiner

IMAGE PROCESSING METHOD AND DEVICE FOR PROCESSING IMAGE, SERVER AND STORAGE MEDIUM

CROSS REFERENCE TO RELATED APPLICATIONS

This application claims priority and benefits to Chinese Application No. 201910184113.4, filed on Mar. 12, 2019, the entire content of which is incorporated herein by reference.

TECHNICAL FIELD

The present disclosure relates to the field of image processing, and more particularly, to a method and a device for processing an image, a server and a storage medium.

BACKGROUND

With rapid increasing of image and video data on the Internet, the demand for image processing technology increases. The image processing technology may be used to quickly understand content of pictures or videos, to labeling pictures or videos with corresponding tags, and to recommend certain kinds of pictures or videos to users.

SUMMARY

Embodiments of the present disclosure provide a method for processing an image. The method includes: determining, based on an object type of an object in an image to be processed, a feature expression of the object in image to be processed; and determining an entity associated with the object in the image to be processed based on the feature expression of object in the image to be processed and a feature expression of an entity in a knowledge graph.

Embodiments of the present disclosure provide a server. The server includes: one or more processors and a memory configured to store one or more programs. When the one or more programs are executed by the one or more processors, the one or more processors are caused to implement the method for processing an image according to above embodiments of the first aspect.

Embodiments of the present disclosure provide a computer readable storage medium having computer programs stored thereon. When the programs are executed by a processor, the method for processing an image according to above embodiments of the present disclosure is implemented.

DETAILED DESCRIPTION

The present disclosure will be described in detail below with reference to the accompanying drawings and the embodiments. It should be understood that, the specific embodiments described herein are only used to explain the present disclosure rather than to limit the present disclosure. In addition, it should also be noted that, for convenience of description, only part but not all structures related to the present disclosure are illustrated in the accompanying drawings.

Currently, a method of labelling an image based on an image processing technology to obtain a result of labelling is mainly to set an object tag and to analyze related actions. However, this method may only analyze the content shallowly, and cannot analyze the content deeply to obtain a deep result. As a result, the result of labelling may be non-semantic, which leads to an inaccurate analysis result. In addition, a method of labelling an image using external knowledge graph data to obtain the result of labelling improves the identification effect of tags. However, the tag may be non-semantic, and the picture content cannot be deeply understood.

Therefore, embodiments of the present disclosure provide a method and a device for processing an image, a server and a storage medium, to deeply understand the image using a knowledge graph and to obtain a structured semantic tag of the image.

With embodiments of the present disclosure, based on the object type of the object in the image to be processed, the feature expression of the object in the image to be processed is determined, the entity associated with the object in the image to be processed is determined based on the feature expression of object in the image to be processed and the feature expression of the entity in the knowledge graph to enable deep understanding of the image, thereby facilitating expansion and verification of the entity associated with the object and realizing determination of a structured semantic tag.

Figure 1:
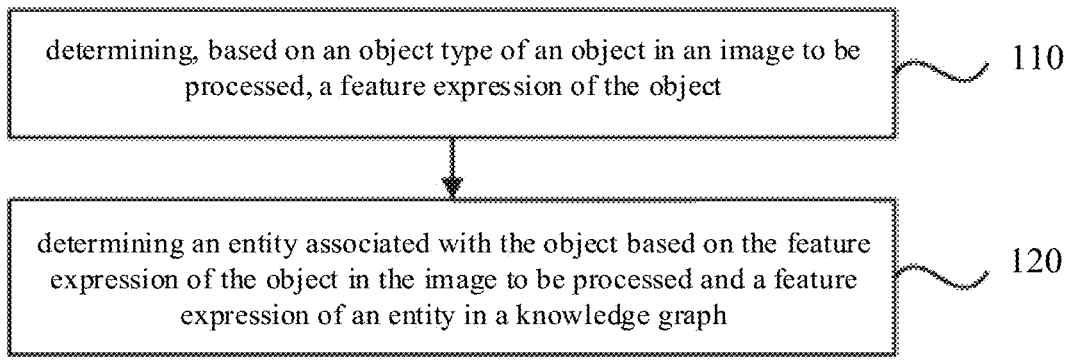
FIG. 1 is a flowchart illustrating a method for processing an image according to embodiments of the present disclosure.

FIG. 1 is a flowchart illustrating a method for processing an image according to embodiments of the present disclosure. The method according to embodiments may be applicable for deeply understanding an image to further determine an image tag. The method may be implemented by a device for processing an image. The device may be implemented by software and/or hardware, and the device may be integrated in a server. As illustrated in FIG. 1, the method according to embodiments may include the following.

At block 110, a feature expression of an object in an image to be processed is determined based on an object type of the object in the image to be processed.

In detail, the image to be processed may be a picture or an image from a video. Features of the object may include entities in the image to be processed. In an example, determining, based on the object type of the object in the image to be processed, the feature expression of the object in the image to be processed may include determining the feature expression of the object in the image to be processed based on the object type and an object image area of the object included in the image to be processed. Exemplarily, target identification may be performed on the image to be processed and multiple objects in the image to be processed may be identified, classified and delineated, to obtain the object type and the object image area of each object. Pixel data of the image to be processed may be input into an identification model to obtain the object type of each object. Further, the pixel data may be input into a depth learning model corresponding to each object type to perform feature extraction on the image to be processed and to obtain the feature expression. In an example, the pixel data may be input into a convolutional neural network (CNN) model for feature extraction to obtain the feature expression corresponding to each object. In some examples, the object of each object type is input to a deep learning model corresponding to the object type to extract features to obtain the feature expression of the object. For example, an image of a human face type is input into a face identification model, such as DeepID, DeepFace or FaceNet to perform feature extraction on the human face to obtain the feature expression of the human face.

At block 120, an entity associated with the object in the image to be processed is determined based on the feature expression of the object in the image to be processed and the feature expression of the entity in the knowledge graph.

In detail, the feature expression of the object may be object features displayed in the image to be processed, such as shape, color, and texture of the object. The feature expression of the object in the image to be processed is matched with feature expressions in the knowledge graph, and an entity in the knowledge graph matching with the feature expression of the object in the image to be processed may be determined as the entity associated with the object in the image to be processed. In an example, determining the entity associated with the object in the image to be processed based on the feature expression of the object in the image to be processed and the feature expression of the entity in the knowledge graph may include: determining the entity associated with the object in the image to be processed based on the feature expression of the object in the image to be processed, a feature expression of the image to be processed, and a feature expression of text associated with the image to be processed, the feature expression of the entity in the knowledge graph and entity attribute information. Exemplarily, in practical applications, an image provided on the Internet usually has text associated with the images, for example, text information associated with the image to be processed, such as text content, a source title, and an article title corresponding to the image. The feature expression of the text is obtained. The entity is further determined by combining the feature expression of the text. The entity attribute information of the entity in the knowledge graph includes an essential attribute of the object, for example, attribute information of a person in the image to be processed such as age, gender, and occupation. The feature expression of the object in the image to be processed, the feature expression of the image to be processed, the feature expression of the text associated with the image to be processed are matched with the feature expression of the entity in the knowledge graph and the entity attribute information and feature expressions are compare, to determine the entity associated with the object in the image to be processed.

In an example, after the entity associated with the object in the image to be processed is determined based on the feature expression of the object in the image to be processed and the feature expression of the entity in the knowledge graph, the method further includes: determining a feature expression of an article based on an entity in the article to which the image to be processed belongs and determining a relevance between the article and the image based on the feature expression of the article and the entity associated with the object in the image to be processed. In detail, it is possible that a low relevance exists between the article to which the image to be processed belongs and the image to be processed. It is likely that the image and the article are linked due to identification errors of the image or the article. Therefore, it may be determined whether the image to be processed is relevant to the article based on the relevance. Exemplarily, the feature expression of the article in the image to be processed is determined, and the relevance between the article and the image to be processed is further determined based on the feature expression of the article and the entity associated with the object in the image to be processed.

With the technical solution according to embodiments of the present disclosure, the feature expression of the object in an image to be processed is determined based on the object type of the object in the image to be processed, and the entity associated with the object in the image to be processed is determined based on the feature expression of the object in the image to be processed and the feature expression of the entity in the knowledge graph. Determining the entity associated with the object in the image to be processed based on the feature expression of the object and the feature expression of the entity in the knowledge graph enables deep understanding of the image, thereby facilitating expansion and verification of the entity associated with the object and realizing determination of a structured semantic tag.

Figure 2:
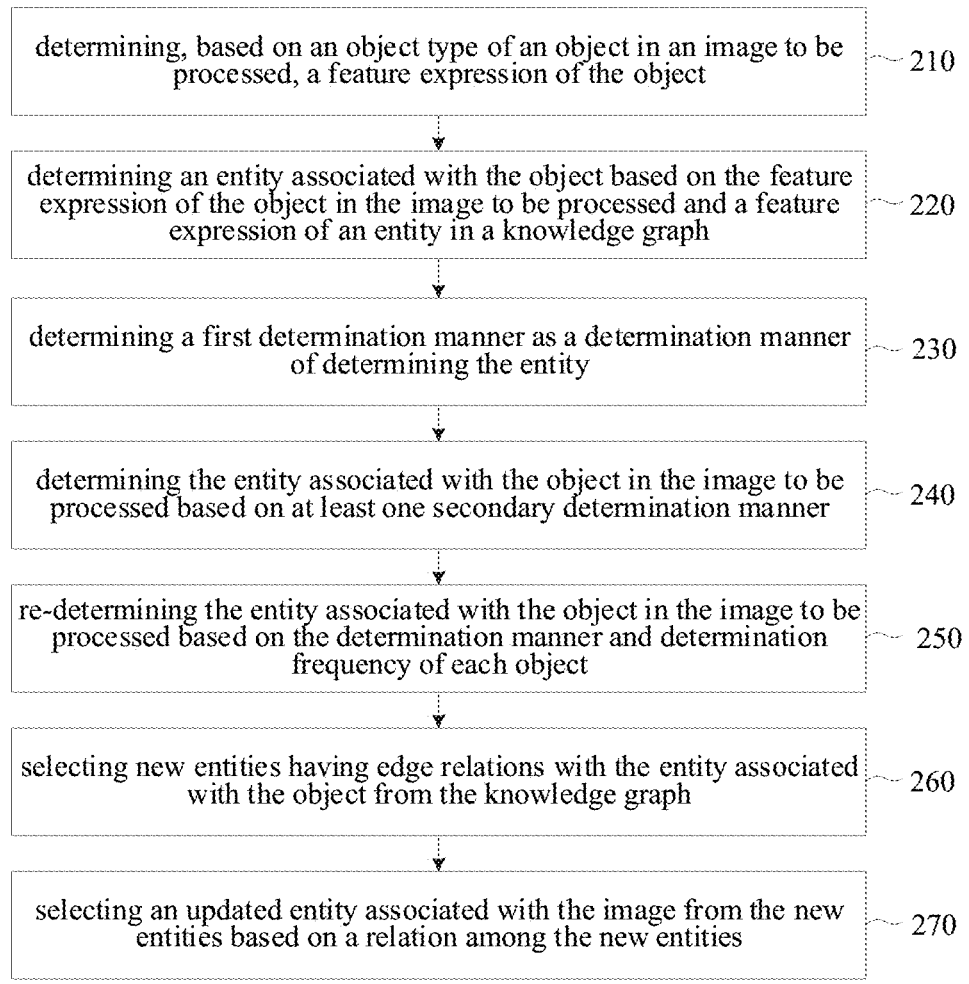
FIG. 2 is a flowchart illustrating a method for processing an image according to embodiments of the present disclosure.

FIG. 2 is a flowchart illustrating a method for processing an image according to embodiments of the present disclosure.

This embodiment is optimized on the basis of embodiment 1, and details which are not described in this embodiment can be referred to the above embodiment. As illustrated in FIG. 2, the method according to this embodiment may include the following.

At block 210, a feature expression of an object in an image to be processed is determined based on an object type of the object in the image to be processed.

At block 220, an entity associated with the object in the image to be processed is determined based on the feature expression of the object in the image to be processed and a feature expression of an entity in a knowledge graph.

At block 230, a first determination manner is determined as a determination manner of the entity determined.

In detail, the first determination manner may be the manner in the block 220 for determining the entity. That is, the entity associated with the object in the image to be processed is determined based on the feature expression of the object in the image to be processed and the feature expression of the entity in the knowledge graph.

At block 240, the entity associated with the object in the image to be processed is determined by at least one secondary determination manner.

In detail, the secondary determination manner may be a determination manner other than the determination manner of the block 220. For example, an image provided on the Internet usually has text associated with the image, such as, text information like text content, a source title, and an article title corresponding to the image. Text entities can be obtained through a feature expression of the text. However, a relevance between the text and the image may be low. Therefore, a manner of determining the associated entity based on the text information relevant to the image to be processed, with a secondary method of determining an image relevance result based on the text information, may be determined as a secondary determination manner.

In an example, determining the entity associated with the object in the image to be processed based on at least one secondary determination manner may include matching the image to be processed with an image of a candidate entity to determine the entity associated with the image to be processed. In an example, determining the entity associated with the object in the image to be processed based on at least one secondary determination manner may include matching the text to which the image to be processed belongs with the knowledge graph to determine the entity associated with the image to be processed. Exemplarily, the image to be processed is matched with the image of the candidate entity. When a matching result satisfies conditions, it may be determined that the candidate entity is associated with the image to be processed. In some examples, the text of the article to which the image to be processed belongs is matched with the knowledge graph. When a matching result satisfies conditions, it may be determined that a matched entity is the entity associated with the image to be processed.

For example, the image to be processed is matched with the image of the candidate entity to determine an actor entity in the image to be processed. In another example, the text of the article to which the image belongs is matched with the knowledge graph to determine the actor entity associated with the text entity in the article.

At block 250, the entity associated with the object in the image to be processed is re-determined based on the determination manner and determination frequency of each entity.

For example, the determination manner and the determination frequency corresponding to the determination manner may be added to the feature expression of the entity for determining the entity associated with the object in the image to be processed, such that the entity associated with the object in the image to be processed is re-determined. For example, based on the re-determined actor entity, a character entity is determined from the knowledge graph. The character entity may be added to the entity associated with the object in the image to be processed.

At block 260, new entities having edge relations with the entity associated with the object are selected from the knowledge graph.

In detail, the entity associated with the object is verified based on the new entities having the edge relations with the entity associated with the object in the knowledge graph. For example, an entity in the knowledge graph is a TV series named "To the Sky Kingdom", the entity having the edge relation may be: Bai Qian (a character). That is, the character of Bai Qian has the edge relation with the TV series named "To the Sky Kingdom". By selecting the new entities having the edge relations with the entity associated with the object, attributes of the entity may be deeply understood.

At block 270, an updated entity associated with the image is selected from the new entities based on a relation among the new entities.

In detail, the relation among the new entities is obtained. For example, an intersection operation is performed on the new entities. The intersection of the new entities may be used as the updated entity associated with the image. For example, if three entities are associated with one image, three sets of new entities having the edge relation with the three entities respectively are selected from the knowledge graph. The intersection of the three sets of new entities corresponding t the three entities are used as the updated entity associated with the image. Exemplarily, the TV series that each actor entity in the image has starred in are obtained. The intersection of the TV series are obtained as the updated entity associated with the image.

Figure 3:
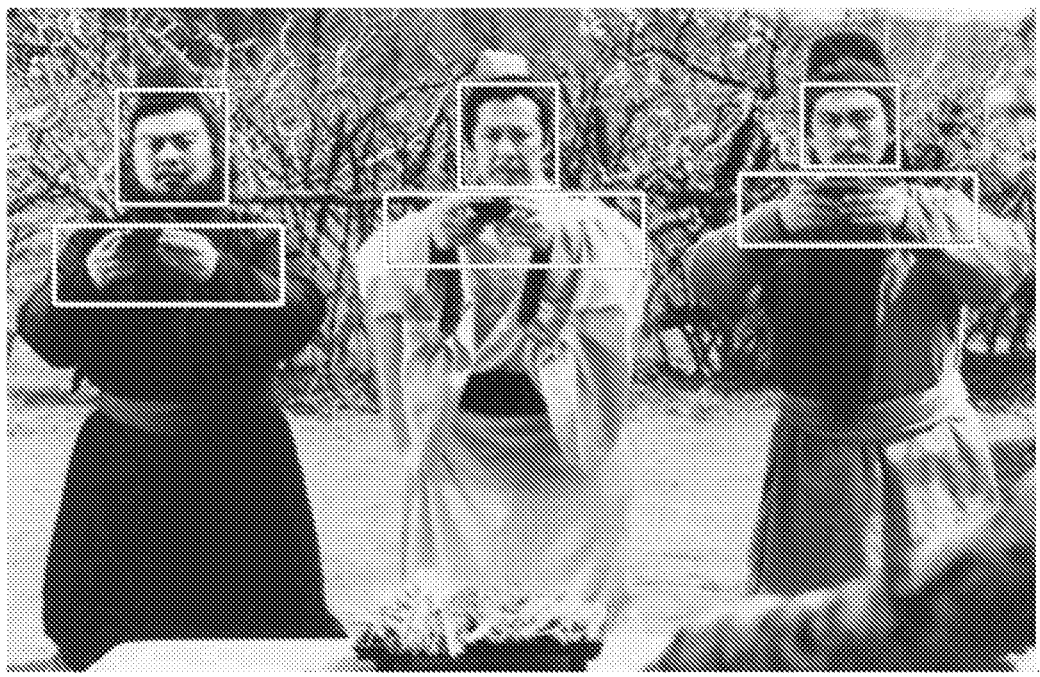
FIG. 3 is a schematic diagram of determining an entity associated to an image according to embodiments of the present disclosure.

In an example, FIG. 3 is a schematic diagram of determining an entity associated with an image according to Embodiment 2 of the present disclosure. As illustrated in FIG. 3, an entity associated with an object in an image to be processed is determined. An entity corresponding to the object in the image is obtained by image identification and classification, and feature extraction. For example, entities in the image are identified as actors, namely Liu Bei, Guan Yu, and Zhang Fei. Based on entities in the knowledge graph that have the edge relation with Liu Bei, Guan Yu, and Zhang Fei, it may be determined that each character corresponds to the TV series named "Romance of the Three Kingdoms". Further, it may be determined that plot corresponding to the image is Peach Garden Oath, based on the TV series and the three characters. In an example, the entities corresponding to the object in the image are obtained by image identification and classification, and feature extraction. For example, entities in the image are identified as actors, namely Liu Bei, Guan Yu, and Zhang Fei. A worship action is identified from the image to be processed. It may be determined that the plot corresponding to the image to be processed is Peach Garden Oath. It should be noted that in FIG. 3, in order to distinguish the objects displayed from the background, a white rectangle is used to indicate the object image area, which is not specifically limited.

In embodiments of the present disclosure, the first determination manner is determined as the determination mode of determining the entity; the entity associated with the object in the image to be processed is determined by the at least one secondary determination manner; and the entity associated with the object in the image to be processed is re-determined based on the determination manner and determination frequency of each entity. The new entities having the edge relation with the entity associated with the object are selected from the knowledge graph. The updated entity associated with the image is selected from the new entities based on the relations among the new entities. Through the secondary determination manner, the image may be deeply understood and the entity associated with the image may be expanded. The updated entity associated with the image is determined based on the relation among the new entities, thereby implementing deep analysis and verification of the image and accurately obtaining a semantic tag of the image.

Figure 4:
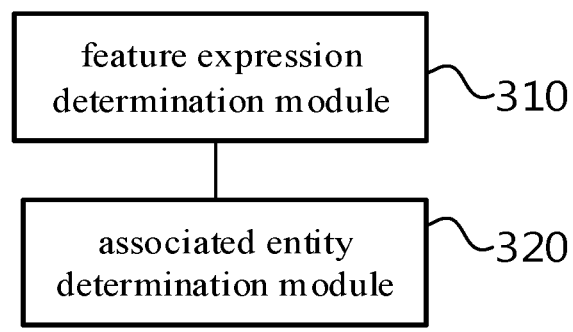
FIG. 4 is a schematic diagram illustrating a device for processing an image according to embodiments of the present disclosure.

FIG. 4 is a schematic diagram illustrating a device for processing an image according to embodiments of the present disclosure. The device is applicable for deeply understanding images to further determine an image tag. The device may be implemented by software and/or hardware, and may be integrated in a server. As illustrated in FIG. 4, the device may further include: a feature expression determination module 310, and an associated entity determination module 320.

The feature expression determination module 310 may be configured to determine, based on an object type of an object in an image to be processed, a feature expression of the object in the image to be processed.

The associated entity determination module 320 may be configured to determine an entity associated with the object in the image to be processed based on the feature expression of the object in the image to be processed and a feature expression of an entity in a knowledge graph.

In an example, the feature expression determination module 310 may be configured to determine the feature expression of the object in the image to be processed, based on the object type of the object in the image to be processed and an object image area.

In an example, the associated entity determination module 320 may be configured to determine the entity associated with the object in the image to be processed based on the feature expression of the object in the image to be processed, a feature expression of the image to be processed, a feature expression of text associated with the image to be processed, the feature expression of the entity in the knowledge graph and entity attribute information.

In an example, the device may further include: an article feature expression determination module, and a relevance determination module.

The article feature expression determination module may be configured to determine a feature expression of an article based on an entity in the article to which the image to be processed belongs.

The relevance determination module may be configured to determine a relevance between the article and the image based on the feature expression of the article and the entity associated with the object in the image to be processed.

In an example, the device may further include: a determination manner determining module, a secondary determination module, and an associated entity redetermination module.

The determination manner determining module may be configured to determine a first determination manner as a determination manner of determining the entity.

The secondary determination module may be configured to determine the entity associated with the object in the image to be processed by at least one secondary determination manner.

The associated entity redetermining module may be configured to re-determine the entity associated with the object in the image to be processed based on the determination manner and determination frequency of each entity.

In an example, the secondary determination module may be further configured to match the image to be processed with an image of a candidate entity to determine the entity associated with the image to be processed; and/or, match a text to which the image to be processed belongs with the knowledge graph to determine the entity associated with the image to be processed.

In an example, the device may further include a selecting module and an updated entity selecting module.

The selecting module is configured to select new entities having edge relations with the entity associated with the object from the knowledge graph.

The updated entity selecting module may be configured to select an updated entity associated with the image from the new entities based on a relation among the new entities.

The device for processing an image according to above embodiments is used to perform the method for processing an image according to any of the above embodiments, and the technical principle and the generated technical effect are similar, which are not described herein again.

Figure 5:
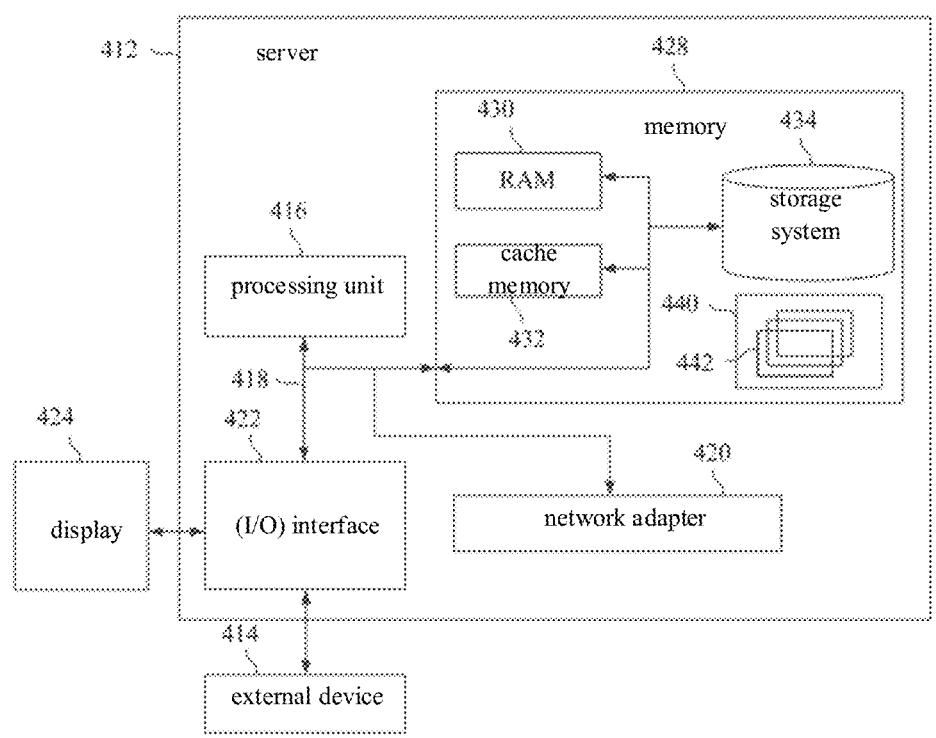
FIG. 5 is a schematic diagram illustrating a server according to embodiments of the present disclosure.

FIG. 5 is a schematic diagram illustrating a server according to embodiments of the present disclosure. FIG. 5 illustrates a block diagram of an exemplary server 412 applicable for implementing embodiments of the present disclosure. The server 412 illustrated in FIG. 5 is merely an example and should not impose any limitation on the function and scope of use of the embodiments of the present disclosure.

As illustrated in FIG. 5, the computer device 412 may be represented via a general computer device form. Components of the computer device 412 may include but be not limited to one or more processors or processing units 416, a system memory 428, a bus 418 connecting various system components including the system memory 428 and the processing units 416.

The bus 418 represents one or more of several types of bus structures, including a memory bus or a memory controller, a peripheral bus, a graphics acceleration port, a processor, or a local bus using any of a variety of bus structures. For example, these architectures include, but are not limited to, an Industry Standard Architecture (hereinafter referred to as ISA) bus, a Micro Channel Architecture (hereinafter referred to as MAC) bus, an enhanced ISA bus, a Video Electronics Standards Association (hereinafter referred to as VESA) local bus and Peripheral Component Interconnection (PCI) bus.

The computer device 412 typically includes a variety of computer system readable media. These media may be any available media accessible by the computer device 412 and includes both volatile and non-volatile media, removable and non-removable media.

The system memory 428 may include a computer system readable medium in the form of volatile memory, such as a random access memory (hereinafter referred to as RAM) 430 and/or a high speed cache memory 432. The computer device 412 may further include other removable or non-removable, volatile or non-volatile computer system storage media. By way of example only, the storage system 434 may be configured to read and write a non-removable and non-volatile magnetic media (not shown in FIG. 5, commonly referred to as a "hard drive"). Although not shown in FIG. 5, a magnetic disk driver for reading from and writing to a removable and non-volatile magnetic disk (such as "floppy disk") and a disk driver for a removable and non-volatile optical disk (such as compact disk read only memory (hereinafter referred to as CD-ROM), Digital Video Disc Read Only Memory (hereinafter referred to as DVD-ROM) or other optical media) may be provided. In these cases, each driver may be connected to the bus 418 via one or more data medium interfaces. The memory 428 may include at least one program product. The program product has a set (such as, at least one) of program modules configured to perform the functions of various embodiments of the present disclosure.

A program/utility 440 having a set (at least one) of the program modules 442 may be stored in, for example, the memory 428. The program modules 442 include but are not limited to, an operating system, one or more application programs, other programs modules, and program data. Each of these examples, or some combination thereof, may include an implementation of a network environment. The program modules 442 generally perform the functions and/or methods in the embodiments described herein.

The computer device 412 may also communicate with one or more external devices 414 (such as, a keyboard, a pointing device, a display 424, etc.). Furthermore, the computer device 412 may also communicate with one or more communication devices enabling a user to interact with the computer device 412 and/or other devices (such as a network card, modem, etc.) enabling the computer device 412 to communicate with one or more computer devices. This communication can be performed via the input/output (I/O) interface 422. Also, the computer device 412 may communicate with one or more networks (such as a local area network (hereafter referred to as LAN), a wide area network (hereafter referred to as WAN) and/or a public network such as an Internet) through a network adapter 420. As shown, the network adapter 420 communicates with other modules of the computer device 412 over the bus 418. It should be understood that, although not shown, other hardware and/or software modules may be used in connection with the computer device 412. The hardware and/or software includes, but is not limited to, microcode, device drivers, redundant processing units, external disk drive arrays, RAID systems, tap Drive and data backup storage system.

The processing unit 416 is configured to execute various functional applications and data processing by running programs stored in the system memory 428, for example, implementing the method for processing an image according to embodiments of the present disclosure.

Embodiments of the present disclosure provide a computer readable storage medium having computer programs stored thereon. When the programs are executed by a processor, the method for processing an image may be implemented.

The computer storage medium according to the embodiments of the present disclosure may adopt any combination of one or more computer-readable medium. A computer readable medium may be a computer readable signal medium or a computer readable storage medium. The computer readable storage medium may be, but is not limited to, for example, an electrical, magnetic, optical, electromagnetic, infrared, or semiconductor system, apparatus, device, component or any combination thereof. A specific example of the computer readable storage media include (a non-exhaustive list): an electrical connection having one or more wires, a portable computer disk, a hard disk, a random access memory (RAM), a read only memory (ROM), an Erasable Programmable Read Only Memory (EPROM) or a flash memory, an optical fiber, a compact disc read-only memory (CD-ROM), an optical memory component, a magnetic memory component, or any suitable combination thereof. In context, the computer readable storage medium may be any tangible medium including or storing programs. The programs may be used by an instruction executed system, apparatus or device, or a combination thereof.

The computer readable signal medium may include a data signal propagating in baseband or as part of a carrier which carries computer readable program codes. Such propagated data signal may be in many forms, including but not limited to an electromagnetic signal, an optical signal, or any suitable combination thereof. The computer readable signal medium may also be any computer readable medium other than the computer readable storage medium, which may send, propagate, or transport programs used by an instruction executed system, apparatus or device, or a connection thereof.

The program code stored on the computer readable medium may be transmitted using any appropriate medium, including but not limited to wireless, wireline, optical fiber cable, RF, or any suitable combination thereof.

The computer program code for carrying out operations of embodiments of the present disclosure may be written in one or more programming languages. The programming language includes an object oriented programming language, such as Java, Smalltalk, C ++, as well as conventional procedural programming language, such as "C" language or similar programming language. The program code may be executed entirely on a user's computer, partly on the user's computer, as a separate software package, partly on the user's computer, partly on a remote computer, or entirely on the remote computer or server. In a case of the remote computer, the remote computer may be connected to the user's computer or an external computer (such as using an Internet service provider to connect over the Internet) through any kind of network, including a Local Area Network (hereafter referred as to LAN) or a Wide Area Network (hereafter referred as to WAN).

It should be noted that, the above are only preferred embodiments and applied technical principles of the present disclosure. Those skilled in the art should understand that, the present disclosure is not limited to the specific embodiments described herein, and various obvious changes, readjustments and substitutions that are made by those skilled in the art will not depart from the scope of the present disclosure. Therefore, although the present disclosure has been described in detail by the above embodiments, the present disclosure is not limited to the above embodiments, and more other equivalent embodiments may be included without departing from the concept of the present disclosure, and the scope of the present disclosure is determined by the scope of the appended claims.

What is claimed is:

1. A method for processing an image, comprising:
    obtaining an object type of an object contained in an image to be processed by classifying the object and obtaining an object image area where the object is located; determining a feature expression of the object by inputting pixel data within the object image area into a deep learning model corresponding to the object type; and
    determining an entity associated with the object by performing matching calculation between the feature expression of the object and a feature expression of the entity in a knowledge graph, the feature expression of the object and the feature expression of the entity associated with the object matching with each other;
    wherein the method further comprises:
    obtaining an article to which the image to be processed belongs;
    determining a feature expression of the article based on an article entity in the article; and
    determining a relevance between the article and the image by performing a matching calculation between the feature expression of the article and the entity in the knowledge graph.

2. The method of claim 1, wherein determining the entity associated with the object in the image to be processed based on the feature expression of the object in the image to be processed and the feature expression of the entity in the knowledge graph comprises:
    determining the entity associated with the object in the image to be processed based on the feature expression of the object in the image to be processed, a feature expression of the image to be processed, and a feature expression of text associated with the image to be processed, the feature expression of the entity in the knowledge graph and entity attribute information, wherein the entity attribute information comprises an essential attribute of the entity.

3. The method of claim 1, further comprising:
    determining a first determination manner as a determination manner of determining the entity;
    determining the entity associated with the object in the image to be processed by at least one secondary determination manner; and
    re-determining the entity associated with the object in the image to be processed based on a determination manner and determination frequency of each entity contained in the knowledge graph;

the determination manner comprising a first determination manner and at least one secondary determination manner.

4. The method of claim 3, wherein determining the entity associated with the object in the image to be processed by the at least one secondary determination manner comprises:
matching the image to be processed with an image of a candidate entity to determine the entity associated with the image to be processed; and/or,
matching text to which the image to be processed belongs with the knowledge graph to determine the entity associated with the image to be processed.

5. The method of claim 1, further comprising:
selecting new entities having edge relations with the entity associated with the object from the knowledge graph, wherein edge relation refers to an edge connecting a new entity with the entity associated with the object; and
selecting an updated entity associated with the image from the new entities based on an intersection of the new entities.

6. A server, comprising:
one or more processors;
a memory, configured to store one or more programs; and
wherein when the one or more programs are executed by the one or more processors, the one or more processors are caused to:
obtain an object type of an object contained in an image to be processed by classifying the object, obtain an object image area where the object is located, and determine a feature expression of the object by inputting pixel area within the object image area into a deep learning model corresponding to the object type; and
determine an entity associated with the object by performing matching calculation between the feature expression of the object and a feature expression of the entity in a knowledge graph, the feature expression of the object and the feature expression of the entity associated with the object matching with each other;
wherein the one or more processors are caused further to:
obtain an article to which the image to be processed belongs;
determine a feature expression of an article based on an article entity in the article; and
determine a relevance between the article and the image by performing the matching calculation between the feature expression of the article and the entity in the knowledge graph.

7. The server of claim 6, wherein the one or more processors are caused to determine the entity associated with the object in the image to be processed based on the feature expression of the object in the image to be processed and the feature expression of the entity in the knowledge graph by:
determining the entity associated with the object in the image to be processed based on the feature expression of the object in the image to be processed, a feature expression of the image to be processed, and a feature expression of text associated with the image to be processed, the feature expression of the entity in the knowledge graph and entity attribute information, wherein the entity attribute information comprises an essential attribute of the entity.

8. The server of claim 6, wherein the one or more processors are caused further to:
determine a first determination manner as a determination manner of determining the entity;
determine the entity associated with the object in the image to be processed by at least one secondary determination manner; and
re-determine the entity associated with the object in the image to be processed based on a determination manner and determination frequency of each entity contained in the knowledge graph;
the determination manner comprising a first determination manner and at least one secondary determination manner.

9. The server of claim 8, wherein the one or more processors are caused to determine the entity associated with the object in the image to be processed by the at least one secondary determination manner by:
matching the image to be processed with an image of a candidate entity to determine the entity associated with the image to be processed; and/or,
matching text to which the image to be processed belongs with the knowledge graph to determine the entity associated with the image to be processed.

10. The server of claim 6, wherein the one or more processors are caused further to:
select new entities having edge relations with the entity associated with the object from the knowledge graph, wherein edge relation refers to an edge connecting a new entity with the entity associated with the object; and
select an updated entity associated with the image from the new entities based on an intersection of the new entities.

11. A non-transitory computer readable storage medium, having computer programs stored thereon, wherein when the programs are executed by a processor, a method for processing an image is implemented, the method comprising:
obtaining an object type of an object contained in an image to be processed by classifying the object and obtaining an object image area where the object is located; and determining a feature expression of the object by inputting pixel area within the object image area into a deep learning model corresponding to the object type; and
determining an entity associated with the object by performing matching calculation between the feature expression of the object and a feature expression of the entity in a knowledge graph, the feature expression of the object and the feature expression of the entity associated with the object matching with each other;
wherein the method further comprises:
obtaining an article to which the image to be processed belongs;
determining a feature expression of the article based on an article entity in the article; and
determining a relevance between the article and the image by performing a matching calculation between the feature expression of the article and the entity in the knowledge graph.

12. The non-transitory computer readable storage medium of claim 11, wherein determining the entity associated with the object in the image to be processed based on the feature expression of the object in the image to be processed and the feature expression of the entity in the knowledge graph comprises:
determining the entity associated with the object in the image to be processed based on the feature expression of the object in the image to be processed, a feature expression of the image to be processed, and a feature expression of text associated with the image to be processed, the feature expression of the entity in the knowledge graph and entity attribute information, wherein the entity attribute information comprises an essential attribute of the entity.

13. The non-transitory computer readable storage medium of claim 11, wherein the method further comprises:
   determining a first determination manner as a determination manner of determining the entity;
   determining the entity associated with the object in the image to be processed by at least one secondary determination manner; and
   re-determining the entity associated with the object in the image to be processed based on a determination manner and determination frequency of each entity contained in the knowledge graph;
   the determination manner comprising a first determination manner and at least one secondary determination manner.

14. The non-transitory computer readable storage medium of claim 11, wherein the method further comprising:
   selecting new entities having edge relations with the entity associated with the object from the knowledge graph, wherein edge relation refers to an edge connecting a new entity with the entity associated with the object; and
   selecting an updated entity associated with the image from the new entities based on an intersection of the new entities.

* * * * *